R. S. PEASE.
POT FOR USE IN THE MANUFACTURE OF GLASS.
APPLICATION FILED OCT. 19, 1912.
1,180,876.
Patented Apr. 25, 1916.
3 SHEETS—SHEET 2.
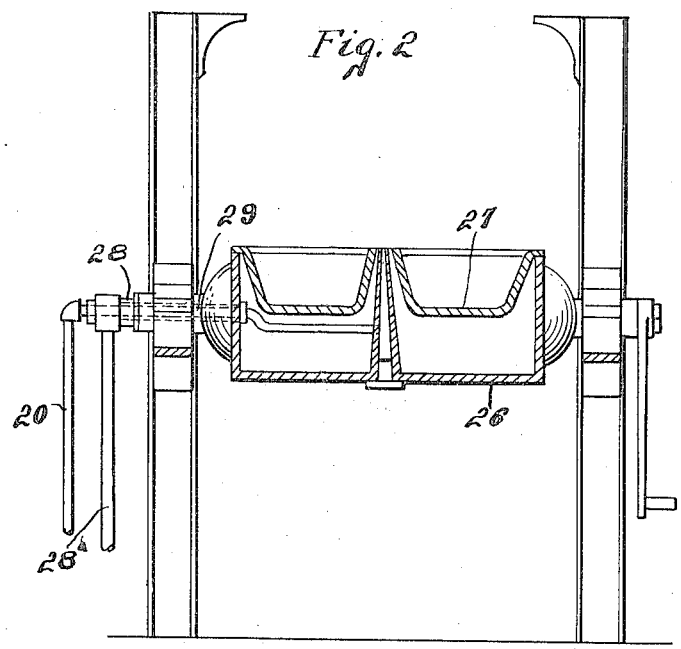
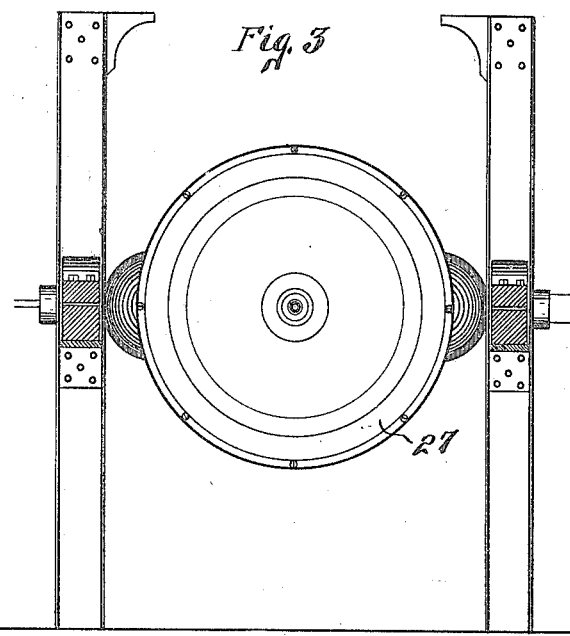
WITNESSES:
INVENTOR.
BY
ATTORNEY.

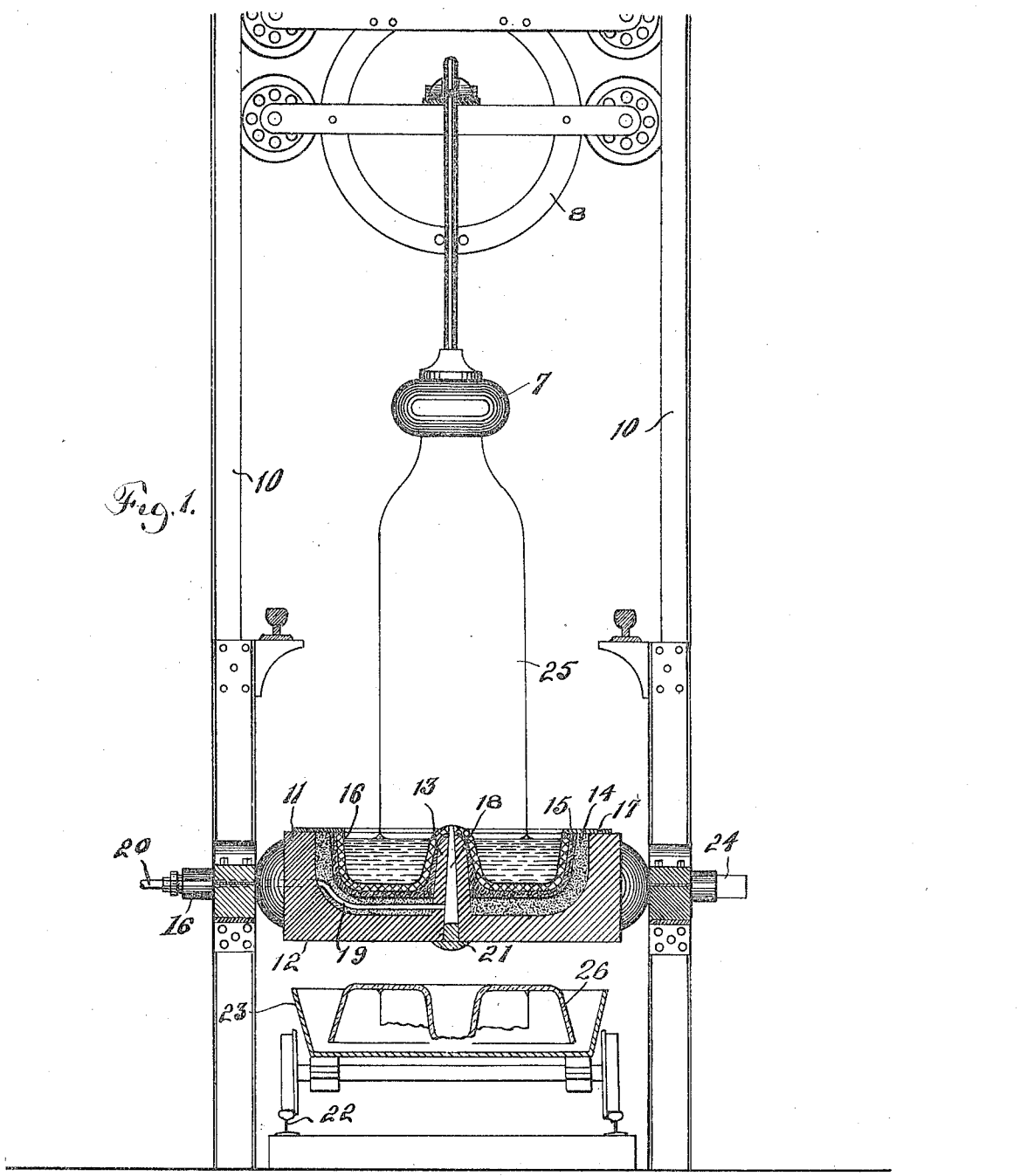

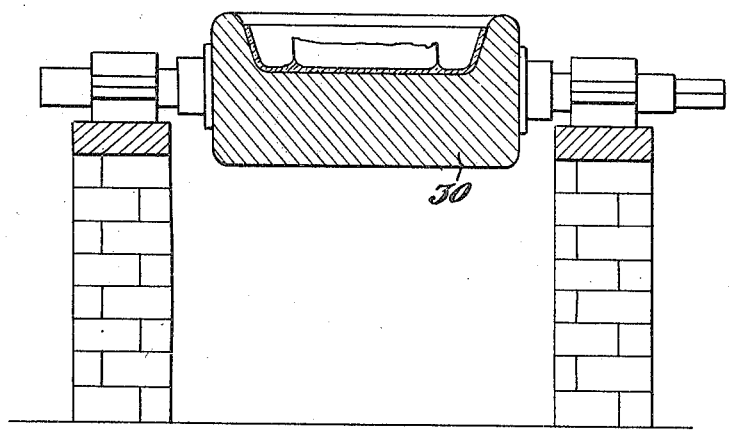
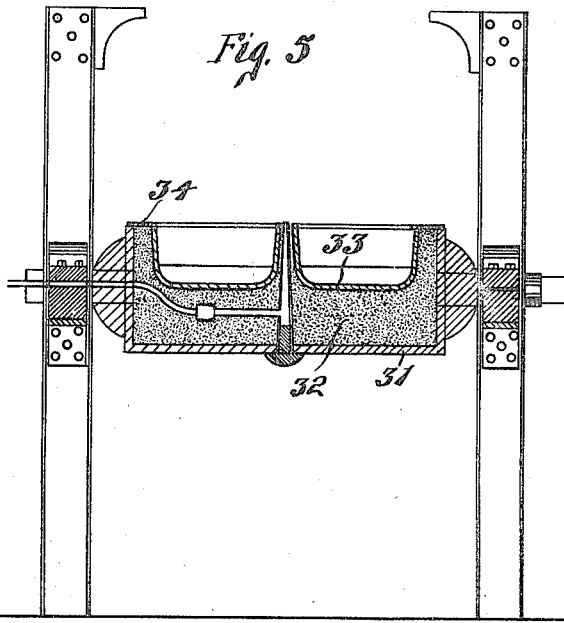

UNITED STATES PATENT OFFICE.

ROGER S. PEASE, OF PITTSBURGH, PENNSYLVANIA, ASSIGNOR TO THE PITTSBURGH PLATE GLASS COMPANY, OF PITTSBURGH, PENNSYLVANIA, A CORPORATION OF PENNSYLVANIA.

POT FOR USE IN THE MANUFACTURE OF GLASS.

1,180,876.   Specification of Letters Patent.   Patented Apr. 25, 1916.

Application filed October 19, 1912. Serial No. 726,756.

*To all whom it may concern:*

Be it known that I, ROGER S. PEASE, a citizen of the United States, residing in Pittsburgh, in the county of Allegheny and State of Pennsylvania, have invented a certain new and useful Pot for Use in the Manufacture of Glass, of which the following is a specification.

The invention relates to a pot for use in the manufacture of glass to which the glass will not adhere and from which the glass can be readily removed or discharged without the application of heat, and it is of especial value in connection with glass drawing operations, as will hereinafter appear. Among the primary objects of my invention are; the provision of a pot to which the glass will not adhere, whereby saving in time and fuel consumption is effected; and in general the provision of a pot of the character described whereby the progress of manufacture will be greatly expedited and simplified, thereby increasing production and reducing the cost thereof. My invention further contemplates the improvement of the quality of the product. These, together with such other objects as may hereinafter appear or are incidental to my invention, I attain by means of a construction various embodiments of which are disclosed in the accompanying drawings wherein—

Figure 1 is a side elevation of an apparatus for drawing glass cylinders, with my improved form of non-adherent pot shown in section in position therein; Figs. 2 and 3 are a section and plan view of another form of pot, and Figs. 4 and 5 are sectional views of still other forms of pot.

My invention primarily is designed for use in glass drawing operations, such for example as the drawing of glass cylinders for the making of window glass. In drawing glass from a tank, a portion of the molten glass adjacent the point of drawing becomes relatively cooler than the remaining glass, and the presence of this together with such portions of the cylinder as are cut off or break off when the cylinder is cut off and removed, has the following results; first, it incurs a loss of time necessarily incident to the remelting or reheating of this glass to proper drawing conditions, a loss that has been found to greatly increase the cost of production; and second, the texture of such glass appears to change and in subsequent draws the glass is poor and breakage and total losses occur, even though the glass has been remelted. In drawing from pots the residual parts remaining in the pot must be removed in order to secure effective results, and this is accomplished by melting out such portions, the fuel consumed and the loss of time incurred tending to increase the cost of production. My invention contemplates among other things the complete removal of the portions of glass above referred to from the molten glass utilized in succeeding operations, thereby insuring superior quality in the production; and it further contemplates a simple apparatus whereby the reheating and remelting operations are eliminated and the process of manufacture greatly expedited, thus obtaining a maximum production at a reduced cost. I attain these ends by the provision of a pot to which the said portions of glass will not adhere and from which said portions may be readily removed without the need of applying heat. In this specification I shall describe its application to a cylinder drawing mechanism, reference being first had to Fig. 1.

As there shown, a drawing bait 7 is supported from a carriage 8 slidably mounted on the guide rails or frame 10. Trunnioned in the lower part of the frame is one embodiment of my improved pot 11 which is filled with molten glass in any preferred manner. The pot comprises a body portion 12, preferably composed of metal, which is hollowed or cupped out and has an upstanding standard 13 projecting from the central part of the hollowed out portion. A layer 14 of sand or other heat retaining material covers the upper surface of the pot and in turn is protected by a sheathing 15 preferably composed of a pastelike substance which will maintain the sand in place. Over the paste is a lining member 16 of copper, platinum, German silver, or other material to which glass does not adhere. It will be observed that the sides of the cupped out portion slope outwardly. The lining member 16 is held in position by means of the annular plate 17. Air is supplied for the drawing operation through the passage 18 in the core 13, the port 19 which extends through one trunnion and opens into the passage 18, and the pipe 20 which leads to any suitable source of supply. Any portions of glass that may enter the passage 18 can be readily removed by taking out the plug 21. Extending beneath the drawing apparatus is a track 22 upon which is mounted a car 23 which can be moved beneath the pot 11 so that the contents of the latter will be dumped into the car when the pot is inverted as will hereinafter appear. One trunnion of the pot is provided with a squared end 24 to receive an operating handle.

The operation of this device is as follows: The pot is turned to the position indicated in Figure 1 and is filled with molten glass, after which the bait 7 is immersed in the glass and thereafter elevated, drawing a cylinder 25, the requisite amount of air being supplied as previously pointed out. The cylinder is centered, that is, maintained in vertical alinement, as the drawing proceeds, by the standard 13, thereby insuring uniformity of product. When the cylinder is completed it is cut off, leaving in the pot such portions of the original charge of glass as are unused, and such portions of the cylinder as may have been cut off or have broken off, all of such portions, as previously pointed out, being unfit for further use until thoroughly reheated and melted to proper drawing consistency. In order to prepare the pot for a fresh charge of glass, the pot is inverted and the residual parts of the previous drawing operation fall out of the pot into the car 23, leaving the surface of the pot clean. This is clearly shown in the lower portion of Fig. 1, though it will be understood that such residual parts may be of different configuration than as shown. The pot is then turned back to operative position and a fresh charge of glass supplied, after which the drawing can again proceed.

The advantages of this construction are that it entirely eliminates the troublesome residual portions of previous drawing operations and thereby secures superiority of product and reduces loss from breakages resulting from impurities and defective glass to a minimum. At the same time economy of operation is attained, since it will be readily apparent that the drawing operations can be repeated with great rapidity. This construction also does away with fires for melting out the residual portions of glass, inasmuch as the glass will fall out of the pot by the force of gravity and can be readily loosened, for example, by a tool. The advantages of the particular construction of pot illustrated are that it retains the heat for a considerable period of time, and that the lining members can be readily renewed.

In Fig. 2 I have shown a section of another form of pot which has the same general structural and functional characteristics as that just described, but is comprised of a body portion 26 to which is secured a nonadherent lid or plate 27 which is hollowed out to form the glass containing receptacle. As before, air is supplied to the hollow standard through a pipe 20 which extends through the pipe 28 which is mounted in the hollow trunnion 29 in such manner that it is open at its inner end. The pipe 28ª is connected to the outer end of the pipe 28 and leads to a source of water or other cooling agent. The advantages of this construction are that the plate 27 can be readily removed and replaced, and that the pot may be cooled and thereby make the removal of the glass easier. Fig. 3 shows the pot turned through 90°.

In Fig. 4 I have illustrated a pot which is composed of a block of soapstone 30, the pot having the same general configuration as those previously described. The glass will not adhere to the soapstone and will readily fall out when the pot is reversed. In this construction, however, the drawing is accomplished by the usual mechanism wherein the air is supplied through the usual form of bait and blowpipe.

In Fig. 5 another modification is illustrated. In this form the pot is comprised of a metal body portion 31, a large quantity of sand packing 32, or other heat retaining material, and a lining member 33 of German silver or similar non-adherent substance, the lining member and sand being retained by the plate 34. The chief advantage incident to this construction is that the heat is retained for a considerable period of time, tending to secure better drawing conditions.

From the foregoing it is thought that the advantages of the device will be clear and broadly considered my invention consists in the provision of a glass containing receptacle to which the glass does not adhere, and from which the residual portions of glass can be removed or discharged without the need of applying heat.

Having thus described my invention and illustrated its use, what I claim as new and desire to secure by Letters Patent, is the following:

1. An invertible pot for use in the manufacture of glass made of material to which the glass will not adhere, and constructed so that the contents will freely fall out when the pot is inverted.

2. An invertible pot for use in the manufacture of glass made of a material to which the glass will not adhere and from which it will readily fall out when the pot is inverted, without the need of applying heat.

3. A pot for use in the manufacture of glass, comprising a body portion, a heat retaining element, and within the body portion a lining over the said element to which the glass will not adhere.

4. A pot for use in the manufacture of glass, comprising a body portion, a heat retaining element, and a lining over the said element to which the glass will not adhere.

5. An invertible pot for use in the manufacture of glass, the sides of which slope outwardly and which is made of a material to which the glass will not adhere and from which it will readily fall out without the application of heat.

In testimony whereof I have hereunto signed my name in the presence of the two subscribed witnesses.

ROGER S. PEASE.

Witnesses:
HARVEY L. LECHNER,
ARCHWORTH MARTIN.

Copies of this patent may be obtained for five cents each, by addressing the "Commissioner of Patents, Washington, D. C."